Jan. 10, 1956 R. F. RINGHAM 2,730,313
AIRFOIL PROTUBERANCE FOR IMPROVING SPOILER EFFECTIVENESS
Filed Dec. 12, 1952 2 Sheets-Sheet 1

INVENTOR.
Rodger F. Ringham
BY W. R. Robertson
Agent

Jan. 10, 1956 R. F. RINGHAM 2,730,313
AIRFOIL PROTUBERANCE FOR IMPROVING SPOILER EFFECTIVENESS
Filed Dec. 12, 1952 2 Sheets-Sheet 2

INVENTOR.
Rodger F. Ringham
BY
W. R. Robertson
Agent

United States Patent Office 2,730,313
Patented Jan. 10, 1956

2,730,313

AIRFOIL PROTUBERANCE FOR IMPROVING SPOILER EFFECTIVENESS

Rodger F. Ringham, Dallas, Tex., assignor, by mesne assignments, to Chance Vought Aircraft, Incorporated, a corporation of Delaware Application December 12, 1952, Serial No. 325,530

5 Claims. (Cl. 244—42)

This invention relates to means for improving the effectiveness of aircraft spoilers.

In the use of spoilers for the lateral control of aircraft it is necessary that they be placed in a rearward location on the wing in order to reduce to a minimum the time lag between spoiler actuation and airplane response.

It is characteristic of spoilers, however, that when so located rearwardly they are not effective at low projections. This is because the boundary layer air is not permanently separated from the wing by the spoiler, but attaches again to the wing rearward of the spoiler.

One method commonly used for preventing boundary layer reattachment and thus reducing this inherent ineffectiveness is to incorporate a spanwise vent immediately to the rear of the spoiler. The use of such a vent, however, causes a serious loss in the lift of the wing and increases the drag unless it is made operable in conjunction with the spoiler. That is, it must open as the spoiler extends, and close as the spoiler retracts to a fully closed position. This, however, increases the complexity of the control mechanism. Also, vibration of the spoiler plate is another ill effect which attends the vented spoiler.

Therefore, it is an object of this invention to provide a device for use on aircraft in conjunction with a retractable spoiler for improving its effectiveness.

It is also an object of this invention to provide means for altering the boundary layer of the air flowing past an airfoil whereby a spoiler of the type which projects a substantially flat surface into the airstream is made more effective.

Other objects and advantages will be apparent from the specification and claims, and from the accompanying drawings which illustrate an embodiment of the invention.

In the embodiment illustrated and described herein the spoiler is of the well-known retractable circular-arc type. A streamlined fairing over the spoiler slot and extending more or less the length of the slot constitutes the basic element of this invention. This fairing is hereinafter referred to as a spoiler bump.

Figure 1:
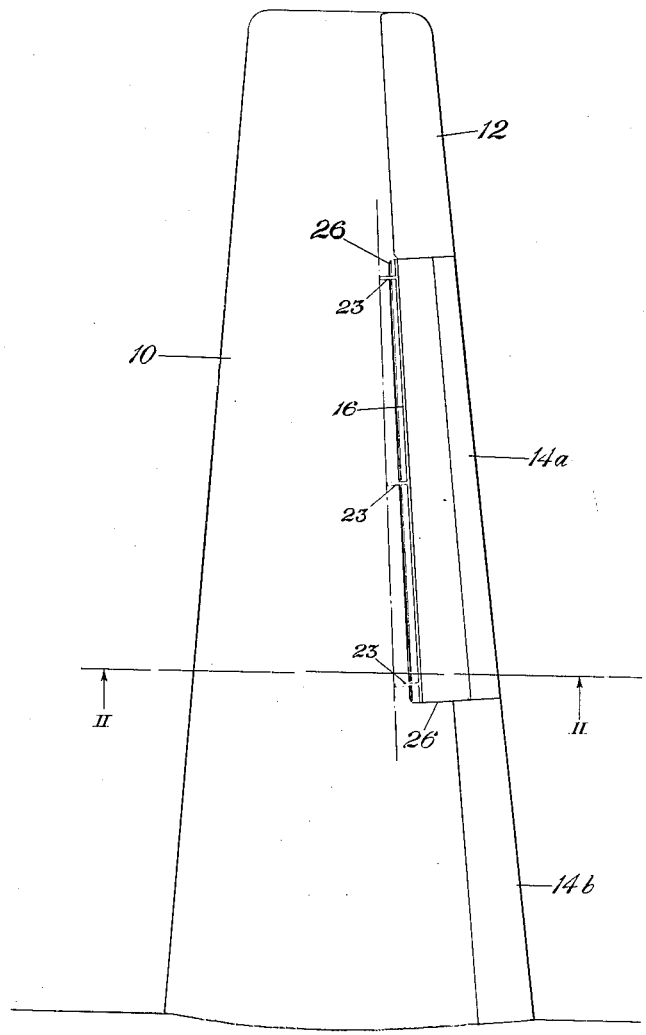
Fig. 1 is a plan view of an airplane wing panel which incorporates this invention.
Figure 2:
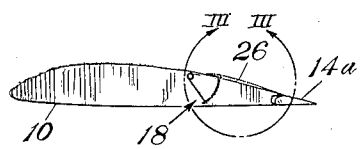
Fig. 2 is a sectional view of the airfoil of Fig. 1 taken at II—II.
Figure 3:
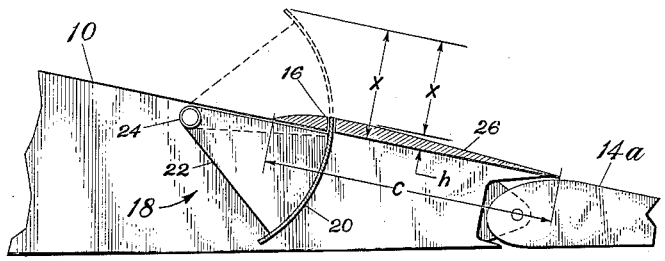
Fig. 3 is an enlarged view of the detail III—III of Fig. 2.
Figure 4:
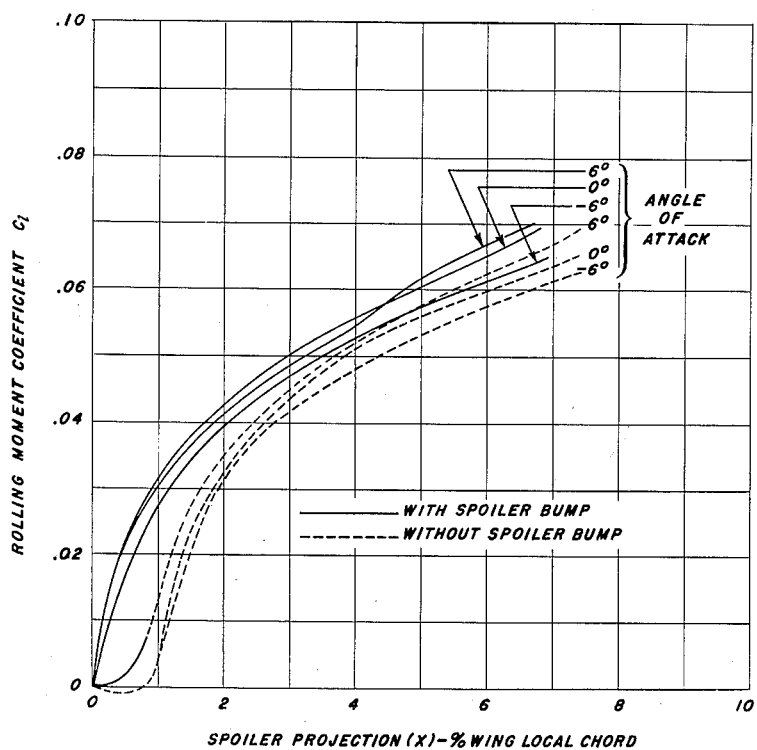
Fig. 4 is a graph which shows the known characteristics of a particular spoiler when used both with and without the spoiler bump.

Referring to Fig. 1, an airplane wing panel 10 having an upper surface with leading and trailing edges is seen as having in the trailing edge area a conventional aileron 12 and conventional flaps 14a and 14b. A slot or opening 16 extending laterally in the mid-portion of the wing is provided in the wing upper surface. A spoiler assembly 18, which is shown more clearly in Figs. 2 and 3, consists of an arcuate spoiler plate 20 extending spanwise in the intermediate portion of the wing which is supported by a plurality of hinge arms each numbered 22. The arms 22 are integral with a torque tube 24 which is supported in suitable journals attached to airplane wing structure and thus pivotally supports the spoiler assembly 18 comprised of the arms 22 and the plate 20 so that counter-clockwise movement of the torque tube 24 (Fig. 3) by the aircraft pilot through suitable controls, not shown, will extend spoiler plate 20 through slot 16 and through a bump 26 to present a disturbing surface to the airflow over the wing and to spoil that airflow. The assembly 18 is shown by solid lines in Fig. 3 in the retracted position and by dotted lines in the fully extended position. It will be understood that the spoiler plate may be substantially flat instead of arcuate or may take the form of and have attachments to the wing similar to a number of conventional spoiler arrangements well known in the aircraft industry of the type where a plate surface is projected from a normally stowed inoperative position within the wing through a slot in the wing surface to an extended operative position above the wing surface in the path of the airflow over the wing surface. As shown in Fig. 1, slots 23 are provided in the wing surface and through bump 26 for the passage of arms 22. The raised streamlined bump or protuberance 26 is located over the slot 16, the slot being continuous vertically through the bump to permit the extension of the spoiler. This is better seen in Fig. 3 wherein a portion of the physical structural protuberance is located ahead of the slot 16, i. e., nearer the wing leading edge, and a greater portion of the protuberance is located behind the slot, i. e., nearer the wing trailing edge. To prevent deflection of the protuberance surface by airflow, it is desirable to have the bump of solid construction, or if hollow, then the construction should be heavy enough to withstand deflection by air disturbances. These bump portions may be affixed to the wing surface as by adhesive bonding or by any other suitable fastening means. It has been determined in wind tunnel tests that a bump having a chord $c$ equal to approximately nineteen percent of the wing local chord with approximately fifteen percent of the bump chord disposed ahead of the spoiler slot and having a height $h$ equal to approximately three-fourths of one percent of the wing local chord will cause considerable improvement in the effectiveness of the spoiler at small projections. This improvement is graphically illustrated in Fig. 4. The ordinate of the graph is the rolling moment coefficient $C_l$ and the abscissa is spoiler projection $(X)$, as shown in Fig. 3. The results of two series of three wind tunnel tests each are represented by the six curves. The tests were conducted with identical conditions prevailing in all six tests, except that one series of three tests was performed on a wing incorporating the spoiler bump, the results being shown by the solid curves and one series of three tests was performed on the same wing but without the spoiler bump, those results being shown by the dotted curves. In each series, one test was performed with the wing at minus six degrees angle of attack, a second test with the wing at zero angle of attack, and a third test at plus six degrees angle of attack. Reference to the dotted curves will show clearly the ineffectiveness of the spoiler without bump at small projections. For example, the dotted curves for both zero and minus six degrees angles of attack show even a negative rolling moment coefficient prevailing for a spoiler projection less than three-fourths of one percent of the wing local chord. And the curve for six degrees angle of attack is little better. Comparison now of the dotted curves to the solid curves shows how the incorporation of the bump overcomes this undesirable characteristic of spoilers. An immediate rolling moment coefficient is obtained with the slightest extension of the spoiler, the coefficient increasing in value steadily with the increasing projection, and increasing with a smooth rate of change.

While the ratio of bump chord to wing local chord indicated above has been found to be near optimum from tests on one wing configuration, it is realized that somewhat different ratios may be desirable for other wing configurations. It is believed however, that the optimum effectiveness for an airfoil protuberance of the present invention for any airfoil surface would be where the bump chord was between fifteen percent and twenty-five percent of the wing local chord with the greatest height of the bump lying between one-half of one percent and one and one-half percent of the wing local chord and having between ten percent and twenty percent of the bump chord disposed ahead of the wing spoiler slot.

It has been shown how the effectiveness of conventional spoilers of the type described herein can be greatly improved by the addition of a streamlined bump. It has been borne out by the practical tests referred to hereinabove that such a streamlined bump, by altering the airflow pattern past the wing, augments the action of the wing spoiler by preventing reattachment to the airfoil surface of the spoiled boundary layer air rearward of the spoiler. It is apparent that various physical structures can be employed to obtain the described configuration. That is, the bump may be made integral with the wing wherein the same skin which covers the wing is so shaped to form also the bump. Or, it may be desired to install the bump as a separate component, being fabricated prior to its assembly to the wing. The latter type of installation would be particularly useful in wind tunnel tests during the early phase of the wing design in that various sizes and shapes of fairings could be tested with no major modification of the wind tunnel wing model.

While only one embodiment of the invention has been shown in the accompanying drawings, it will be evident that various modifications are possible in the arrangement and construction of the spoiler bump device without departing from the scope of the invention.

I claim:

1. A spoiler installation in combination with an airplane wing comprising; a lateral slot in said wing, a spoiler plate having an operable connection with said wing normally positioned within said wing and adapted to be projected above the surface of said wing through said slot, and a deflecting protuberance on said wing extending above the wing surface having a streamlined configuration and disposed parallel to and over said slot for deflecting the flow of boundary layer air in the vicinity of said spoiler, said deflecting surface having a lateral opening therein corresponding to and in registry with said slot through which registering opening and slot said spoiler plate is adapted to project.

2. In combination with an airfoil having a spanwise slot in said airfoil and a spoiler plate having an operable connection with said airfoil adapted to be projected from its inoperative position within said airfoil to an operative position above the airfoil surface through said slot normal to the airflow over said airfoil, a device for increasing the effectiveness of said spoiler at low projections thereof comprising; a streamlined protuberant surface integral with said airfoil and having a substantially blunt leading edge for deflecting the airflow over said airfoil upwardly before it contacts said spoiler when the same is projected into its operative position, said streamlined surface having a slot therein coincident and registering with the slot in said airfoil surface.

3. In an airplane wing a spoiler installation comprising; a lateral slot in the surface of said wing, a spoiler plate having an operable connection with said wing normally stowed in a retracted position within said wing and adapted to be projected upwardly through said slot to an operative position wherein it spoils the flow of boundary layer air, a deflecting protuberant surface secured to said wing parallel to and over said slot, said surface having a lateral opening therein corresponding to and in registry with said slot, said surface having a primary portion ahead of said slot to deflect the boundary layer air over said wing upwardly and having a streamlined rearward portion aft of said slot, said portion providing a deflecting streamlined surface for the passage of boundary layer air thereover when said spoiler is in its retracted inoperative position and for preventing reattachment of spoiled boundary layer air to the wing surface rearwardly of said spoiler plate at small operative projections thereof, the projectible edge of said spoiler being flush with said streamlined protuberance when in its retracted position.

4. In an airplane wing having an upper surface with a leading edge and a trailing edge and including a spoiler plate having an operative connection with said wing and adapted to project above the upper surface of the wing through a spanwise slot in the wing upper surface, a device for improving the effectiveness of the aircraft spoiler plate at low projections thereof comprising; a streamlined airfoil portion protuberant over the adjacent upper surface and integral with the same disposed spanwise over the wing slot and having a maximum height over the wing upper surface of between one-half and one and one-half percent of the height of the wing local chord, and having a chordwise length of between fifteen and twenty-five percent of the length of the wing local chord, and having between ten and twenty percent of its chordwise length disposed ahead of said spoiler plate nearer said leading edge, said streamlined airfoil portion having a slot therein registering with the slot in the upper wing surface through which said spoiler plate projects.

5. In combination with an airfoil wing having an upper surface with a trailing edge and a leading edge and having a spoiler surface projectible through a spanwise opening in the upper surface of the airfoil into the airstream substantially normal thereto, a device for improving the effectiveness of aircraft spoilers comprising; a streamlined portion protuberant over the wing upper surface over said opening and extending spanwise parallel with said opening and having a height of between one-half and one and one-half percent of the height of the chord of said airfoil and having a chord length between fifteen and twenty-five percent of the chord length of said airfoil and having between ten and twenty percent of its chord disposed forward of said opening nearer said leading edge, said portion having a spanwise opening corresponding to and in registry with the spanwise opening in the upper surface of the airfoil.

References Cited in the file of this patent

UNITED STATES PATENTS

| | | |
|---|---|---|
| 1,302,864 | Scherner | May 6, 1919 |
| 1,773,280 | Scott | Aug. 19, 1930 |
| 2,360,116 | Elias | Oct. 10, 1944 |
| 2,402,118 | Ashkenas | June 18, 1946 |
| 2,428,936 | Hunter | Oct. 14, 1947 |
| 2,549,044 | Ashkenas et al. | Apr. 17, 1951 |

FOREIGN PATENTS

| | | |
|---|---|---|
| 38,941 | France | May 11, 1931 |
| 929,942 | France | July 28, 1947 |